(12) United States Patent
Ashman et al.

(10) Patent No.: US 6,959,792 B2
(45) Date of Patent: Nov. 1, 2005

(54) RETRACTION MECHANISM FOR DISC BRAKE ASSEMBLY

(75) Inventors: Glynn Ashman, Stourbridge (GB); Grahame Hickin, Sutton Coldfield (GB)

(73) Assignee: TRW Limited, (GB)

(*) Notice: Subject to any disclaimer, the term of this patent is extended or adjusted under 35 U.S.C. 154(b) by 0 days.

(21) Appl. No.: 10/808,201

(22) Filed: Mar. 24, 2004

(65) Prior Publication Data

US 2004/0195056 A1  Oct. 7, 2004

Related U.S. Application Data (63) Continuation of application No. PCT/GB02/04346, filed on Sep. 25, 2002.

(30) Foreign Application Priority Data

Sep. 25, 2001 (GB) .................................. 0122970

(51) Int. Cl.[7] .............................................. F16B 65/09

(52) U.S. Cl. .................................. 188/73.38; 188/234

(58) Field of Search ............................ 188/73.38, 73.1, 188/72.4, 72.5, 73.31, 73.35, 73.36, 73.37, 188/234

(56) References Cited

U.S. PATENT DOCUMENTS

| | | | | |
|---|---|---|---|---|
| 4,364,455 A | * | 12/1982 | Oshima | 188/1.11 W |
| 4,491,204 A | * | 1/1985 | Dirauf et al. | 188/73.38 |
| 4,574,922 A | * | 3/1986 | Varin et al. | 188/73.35 |
| 4,629,037 A | * | 12/1986 | Madzgalla et al. | 188/71.8 |
| 4,658,938 A | * | 4/1987 | Thiel et al. | 188/73.38 |
| 4,940,119 A | * | 7/1990 | Kondo et al. | 188/73.31 |
| 5,069,313 A | * | 12/1991 | Kato et al. | 188/72.3 |
| 5,251,727 A | * | 10/1993 | Loeffler et al. | 188/73.38 |
| 5,706,916 A | | 1/1998 | Cortes Guasch et al. | |

FOREIGN PATENT DOCUMENTS

GB  747972  4/1956

* cited by examiner

*Primary Examiner*—Pam Rodriguez
(74) *Attorney, Agent, or Firm*—MacMillan, Sobanski & Todd, LLC (57) ABSTRACT

A disc brake assembly comprises an anchor bracket (12), a brake shoe (10) which carries a friction lining (16), the shoe being slidably supported by the anchor bracket (12). The assembly includes a retraction mechanism which is adapted to retract the shoe from the disc when the brake is released. The mechanism comprises at least one pin (24) secured to either a backing plate (14) or the anchor bracket and a spring clip (26) fixed relative to the pin which acts between the pin and the other one of the anchor bracket or the backing plate. Deformation of the spring clip as the shoe is moved towards the disc providing a returning force to pull the friction lining away from the disc when the brake is released.

18 Claims, 8 Drawing Sheets

RETRACTION MECHANISM FOR DISC BRAKE ASSEMBLY

CROSS REFERENCE TO RELATED APPLICATIONS

This application is a continuation of International Application No. PCT/GB02/04346 filed Sep. 25, 2002, the disclosures of which are incorporated herein by reference, and which claimed priority to Great Britain Patent Application No. 0122970.7 filed Sep. 25, 2001, the disclosures of which are incorporated herein by reference.

BACKGROUND OF THE INVENTION

This invention relates in general to vehicle disc brake assemblies and in particular to an improved structure for a retraction mechanism adapted for use in such a vehicle disc brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefor are well known in the art.

A typical disc brake assembly includes an anchor bracket which is secured to a fixed, non-rotatable component of the vehicle A pair of brake shoes are supported on the anchor bracket for sliding movement relative thereto. The brake shoes have respective friction pads which are disposed on opposite sides of a brake disc. The disc, in turn, is connected to the wheel of the vehicle for rotation therewith. To effect braking action, the brake shoes are moved inwardly toward one another so as to frictionally engage the opposed sides of the disc. Such frictional engagement causes retarding or stopping of the rotational movement of the disc and, therefore, the wheel of the vehicle in a controlled manner.

To accomplish this, the disc brake assembly further includes a caliper assembly for selectively moving the brake shoes into frictional engagement with the brake disc. The caliper assembly typically includes guide pins or other components to slidably support a caliper housing relative to the fixed anchor bracket. The caliper housing is generally C-shaped, having an inboard leg disposed adjacent the inboard brake shoe and an outboard leg disposed adjacent to the outboard brake shoe. One or more hydraulically or pneumatically actuated pistons are provided in respective cylindrical recesses formed in the caliper inboard leg adjacent to the inboard brake shoe. When the brake pedal is depressed, the piston and the inboard leg of the caliper are urged apart from one another. Specifically, the piston is urged outwardly, while the outboard leg of the caliper is urged inwardly. As mentioned above, the piston is disposed adjacent to the inboard brake shoe and, therefore, urges it outwardly toward the inner side of the disc. Because the caliper is slidably mounted on the pits of the anchor bracket, the caliper outboard leg (and thus, the outboard brake shoe disposed adjacent thereto) are urged inwardly toward the outer side of the disc. As a result, the brake shoes frictionally engage the opposed sides of the disc.

Frequently, an annular roll-back seal is provided within the cylindrical recess in contact with the outer surface of the piston. The roll-back seal is conventional in the art and performs several functions. First, the roll-back seal provides a seal to define the extent of the cylindrical recess within which the piston is disposed. Second, the roll-back seal is designed to retract the piston inwardly away from the disc by a predetermined distance from the fully engaged position when the brake pedal is released after being depressed. To accomplish this, the roll-back seal frictionally engages the outer surface of the piston, resiliently resisting movement thereof when the brake pedal is depressed. Thus, when the brake pedal is released by the operator of the vehicle, the resilience of the roll-back seal causes the piston to retract within the cylindrical recess and out of contact with the inboard brake shoe.

With repeated usage, the friction pads of the brake shoes wear and become increasingly thinner. When this occurs, the piston and the caliper must move greater distances relative to one another to effect the same braking action as when the friction pads were new. Despite this increased distance of movement of the piston in the outboard direction, it is desirable that the rollback seal retract the piston only by the same predetermined distance away from the disc in the inboard direction. Thus, known roll-back seals are designed to accommodate increased movement of the piston in the outboard direction when the brake pedal is depressed, but to retract the piston inwardly by approximately the same predetermined distance when the brake pedal is subsequently released.

Ideally, when the brake pedal is released, the brake shoes should also be spread apart from one another to prevent any incidental frictional engagement with the disc. If the brake shoes are not moved from engagement with the disc, one or more of the following can occur: disc thickness variation of the disc caused by residual drag of the brake shoes which can cause brake judder; rattle of the brake shoes; squeal of the caliper caused by structural variations; increase of fuel consumption; and inconsistent short pedal feel. To accomplish this, it is known to provide the disc brake assembly with one or more retraction mechanisms for moving the brake shoes apart from one another to prevent frictional engagement with the disc when the brake pedal is released. For example, U.S. Pat. No. 4,364,455 to Oshima, U.S. Pat. No. 4,491,204 to Dirauf et al., U.S. Pat. No. 4,629,037 to Madzgalla et al., U.S. Pat. No. 4,658,938 to Thiel et al, U.S. Pat. No. 4,867,280 to Von Gruenberg et al., U.S. Pat. No. 4,940,119 to Kondo et al., U.S. Pat. No. 5,069,313 to Kato et al., U.S. Pat. No. 5,249,647 to Kobayashi et al., and U.S. Pat. No. 5,251,727 to Loeffler et al. and Great Britain 747,972 to Dunlop Rubber all disclose disc brake assemblies which include a retraction mechanism structure.

SUMMARY OF THE INVENTION

According to a first aspect the invention provides a disc brake assembly comprising an anchor bracket, a brake shoe which carries a friction pad and a piston slidably connected to the anchor bracket which is arranged such that upon movement of the piston relative to the anchor bracket the piston acts upon the brake shoe to move the shoe into contact with a brake disc, and in which the assembly further includes a retraction mechanism which is adapted to retract the brake shoe from the disc when the piston is retracted, the retardation mechanism comprising at least one pin secured to one of the friction pad and the anchor bracket and a spring clip fixed relative to the pin which acts between the pin and the other one of the anchor bracket and the friction pad, deformation of the spring clip as the pad is moved towards the disc providing a returning force to pull the friction lining away from the disc when the piston is retracted.

By anchor bracket we may mean any portion of the brake assembly which in use is fixed relative to the bore of the piston. The bracket may be fixed to the vehicle body or may be provided with a degree of "float" relative to the vehicle body.

The invention thus provides a brake assembly which includes a simple and reliable mechanism for retracting the friction pad from the disc. A low number of parts are required which simplifies the assembly of the brake assembly.

A first portion of pin may be secured to the brake shoe and the spring clip may then be in contact with the anchor bracket. Of course, the opposite may be true, with the pin fixed relative to the bracket and the spring clip contacting the brake shoe.

In a most preferred embodiment, the spring clip may comprise a resilient plate, conveniently of metal, having an opening through which the pin passes and defining at least one wing which is in contact with the anchor bracket, the wing deforming resiliently as the friction pad moves towards the disc. The spring clip can therefore be considered to be a type of resiliently deformable star washer fitted onto the pin The spring clip may define at least two wings which extend in opposing directions away from the opening and each wing is in contact with the anchor bracket. This spring clip is preferably in direct resilient engagement with the pin.

By way of the engagement between the pin and the clip, the clip is fixed in position relative to the pin during normal use but is adapted to slide along the pin in the event that the displacement of the pad relative to the anchor bracket due to wear of the friction lining produces a deformation of the spring clip which exceeds a predefined limit. This provides a mechanism for the automatic adjustment of the amount of return provided to the friction lining as it wears or is otherwise deformed.

For ease of construction, the predefined limit may be substantially dependent upon the shape and location of the spring clip which is arranged such that a force required to move the clip along the pin is only provided when the spring clip is deformed in excess of a predefined amount.

In the most preferred arrangement envisaged by the applicant, the engagement of the spring clip with the pin is such that the force required to move the clip along the pin away from the friction lining is greater than that required to move it along the pin towards the friction lining. Indeed the engagement of the pin and the clip may be arranged such that in normal use the spring clip is permitted to move along the pin in only a single direction.

The retraction device may also provide a biasing force to the friction pad as it is displaced in a direction normal to the plane of the disc relative to the anchor bracket, the biasing force being provided by deformation of a portion of the spring clip. Such displacement may occur as the friction lining contacts the disc and is dragged around by the rotation of the disc.

Whilst only a single retraction mechanism has been described so far it is preferred that two retraction mechanisms are provided which are located at or adjacent each end of the brake shoe. In this ways each end of the pad is retracted from the disc.

The anchor bracket may have many forms as will be readily understood to the man skilled in the art, and indeed more than one piston may be provided for movement of the brake shoe.

According to a second aspect the invention provides a brake shoe assembly for use in a disc brake assembly according to the first aspect of the invention.

According to a third aspect the invention provides a brake shoe assembly which includes a brake shoe assembly adapted for use in a disc brake assembly having at least one pin secured to the brake shoe which carries a spring clip, the spring clip co-operating with the pin through a sliding frictional engagement and having at least one deformable wing which is adapted to contact an anchor bracket of the disc brake assembly, and whereby the engagement between the clip and the pin is such that the clip is fixed relative to the pin until a force applied to the clip exceeds a predetermined limit whereby the clip is adapted to slide along the pin away from the brake shoe.

The engagement of the clip with the pin may be such that the clip is prevented from sliding along the pin towards the brake shoe.

This may be achieved by providing a spring clip which is similar to a star washer and includes one or more tangs which are bent out of the plane of the spring clip towards the brake shoe assembly and project into the opening through which the pin passes to resiliently engage the pin.

A pin may be provided at each end of the brake shoe, each pin carrying a respective spring slip. The or each pin can be fixed at least partially within a bore provided in the brake shoe.

This invention relates to a positive retraction device for a disc brake assembly incorporating an anti-rattle and anti-squeal feature for the disc brake pads supported on the disc brake assembly. The retraction device has two pins or rods anchored to each brake pad and a clip, preferably self-setting, fitted on the pins which compels the pads to float on the abutments and thus stops the pads from ratting and which also adds a damped load to the brake carrier which stops structural vibrations of the carrier reducing squeal. When the brakes are applied, the clips deforms so that when the brakes are released the clip "springs back" to its original form thereby pushing the pads and the brake piston back to their associated original "brake off" positions. This predetermined movement is designed into the clip and pin technology. The retraction device of this invention preferably does not rely on a roll-back seal to pull the piston into the bore and allow a running clearance between the pads and the disc because such rollback is famously invariable. The retraction device of this invention is operative to push the pads and the piston back a controlled amount and providing that the rollback is small will produce a consistent short pedal travel. Alternatively, if piston roll-back is not a consideration of the retraction device of this invention but rather is near zero, then the clips of this invention can be used to control the pad to disc clearance and thus maintain good control over the pedal travel. If piston roll-back is a consideration, then the roll-back seal is not used for roll-back or if it is, it is secondary to the retraction device. If this is the case, the roll back seal can have a surface texture or can be coated in such a manner that it provides not any or very little roll-back function.

In operation, when the brake is applied the pads move in two directions. In the longitudinal direction, the clip distorts until the pad is grounded against the carrier. In the axial direction, the pad moves toward the disc. If the axial movement of the pad is greater than the clip deformation, either through pad wear, high pressure, etc. the clip will slide on the pin. The amount of axial movement of the clip on the pin is controlled by the shape/structure of the clip. Alternatively, it is possible to "reverse" this invention and have the rod anchored on the bracket and the clip reacting against the pad. This invention will work on any single sided or opposed piston caliper. Another advantage of this invention is that the pad to carrier clearance can be increased. This will prevent pad seizure in the carrier gap.

Other advantages of thes invention will become apparent to those skilled in the art from the following detailed description of the preferred embodiment, when read in light of the accompanying drawings.

DETAILED DESCRIPTION OF THE INVENTION

Figure 1:
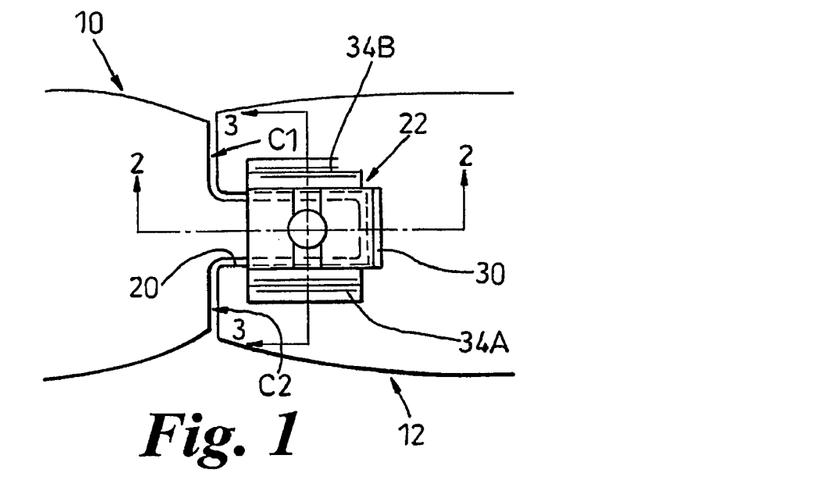
FIG. 1 illustrates a portion of a disc brake assembly including a retraction mechanism according to the invention.
Figure 2:
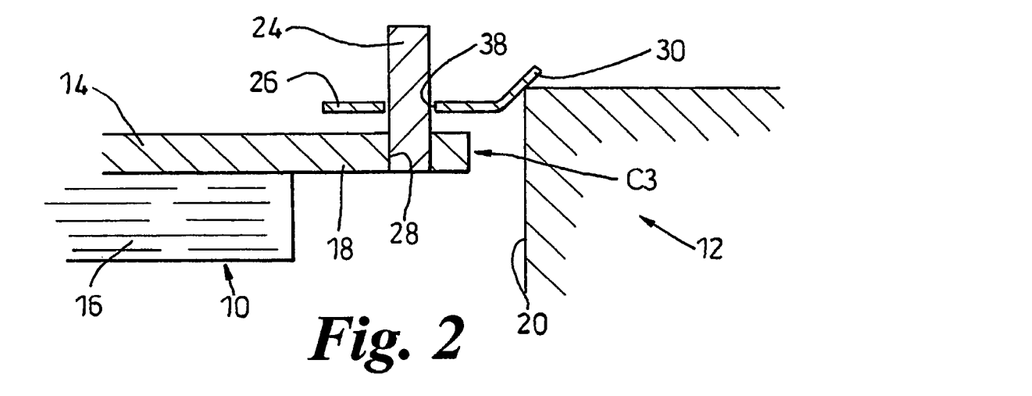
FIG. 2 illustrated a portion of the disc brake assembly taken along line 2—2 of FIG. 1.
Figure 3:
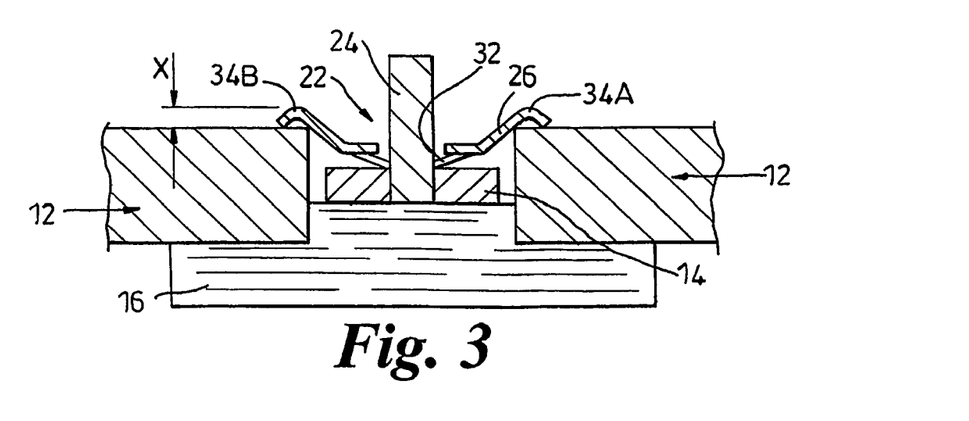
FIG. 3 illustrates a portion of the disc brake assembly taken along line 3—3 of FIG. 1.
Figure 15:
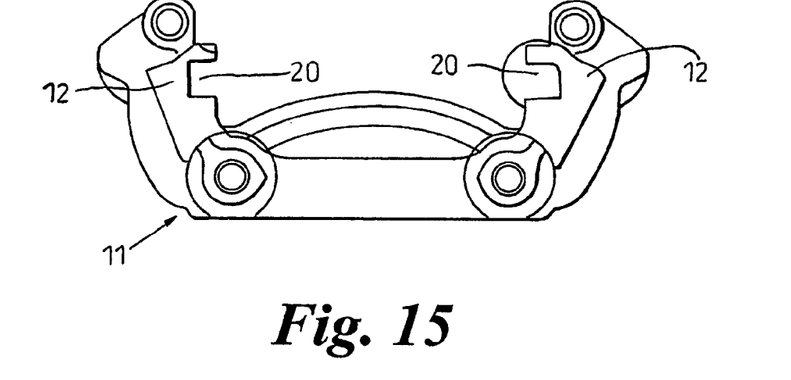
FIG. 15 is a view of a carrier member

Referring now to the drawings, there is illustrated in FIGS. 1 through 3 a portion of a disc brake assembly including a brake shoe assembly 10 and an abutment 12 of a carrier member (shown in FIG. 15 at 11). The brake shoe assembly 10 includes a backing plate 14 having a lining 16 attached thereto. The backing plate 14 includes a pair of opposed ends (only one of such ends is illustrated at 18), which are slidably disposed in a slot 20 of the carrier abutment 12. A retraction mechanism 22 is carried by the disc brake assembly. The retraction mechanism 22 includes a pin 24 and a clip 26. The pin 24 is secured to each of the ends 18 of the backing plate 14 by a suitable manner. The pin 24 can be a roll pin or a serrated pin which is disposed in an opening 28 provided in the end 18. The clip 26 is preferably formed from spring steel or stainless steel and is disposed on or fitted to the pin 24. The clip 26 includes a side leg or extension 30, a pair of opposed upper and lower arms 34A and 34B; prongs 32, and a center opening 38. Also, in FIG. 1, an upper brake shoe to carrier bracket abutment is shown at C1 and a lower brake shoe to carrier bracket abutment is shown at C2. However, either the upper abutment C1, the lower abutment C2 or both can be present depending upon the particular brake shoe assembly 10 design, Alternatively, a brake shoe to carrier bracket abutment can be at the end 18 of the backing plate 14, as shown at C3 in FIG. 2.

FIG. 2 shows that leg 30 of the clip 26 contacts an adjacent surface of the carrier abutment 12. As a result of this, the clip 26 can be useful in reducing anti-rattle of the brake shoe assembly 10 in a longitudinal direction and in damping squeal of the caliper (not shown) of the disc brake assembly.

FIG. 3 shows that the clip 26 is preferably provided with one or more prongs 32 which grip an outer surface of the pin 24. The prongs 32 are operative to retain the clip 26 on the pin 24 and allow movement of the clip 26 relative to the pin 24 in only one direction. Also, in FIG. 3, reference character X indicates the amount of movement of the brake shoe 10 when the disc brake assembly is actuated.

Figure 4:
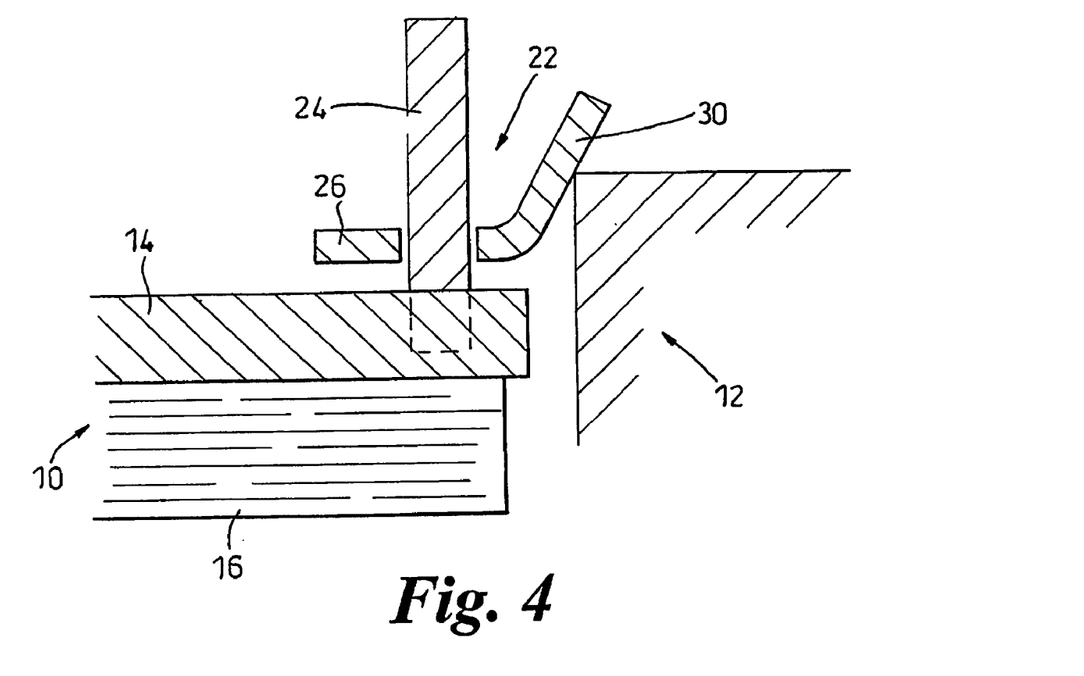
FIG. 4 illustrates the condition of the retraction mechanism when the brakes are not applied.
Figure 5:
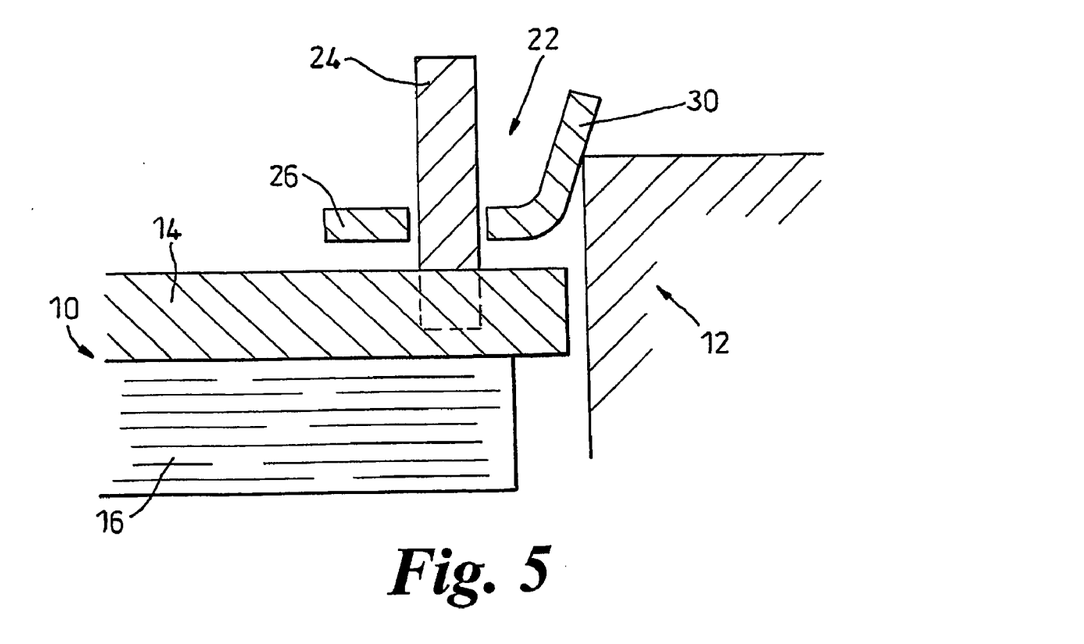
FIG. 5 illustrates the condition of the retraction mechanism when the brakes are applied.

FIGS. 4 and 5 illustrate the condition of the retraction mechanism 22 when the brake is not applied (FIG. 4) and when the brake is applied (FIG. 5). As shown therein, when the brake is applied, the clip 26 moves or deforms as shown in FIG. 5.

Figure 6:
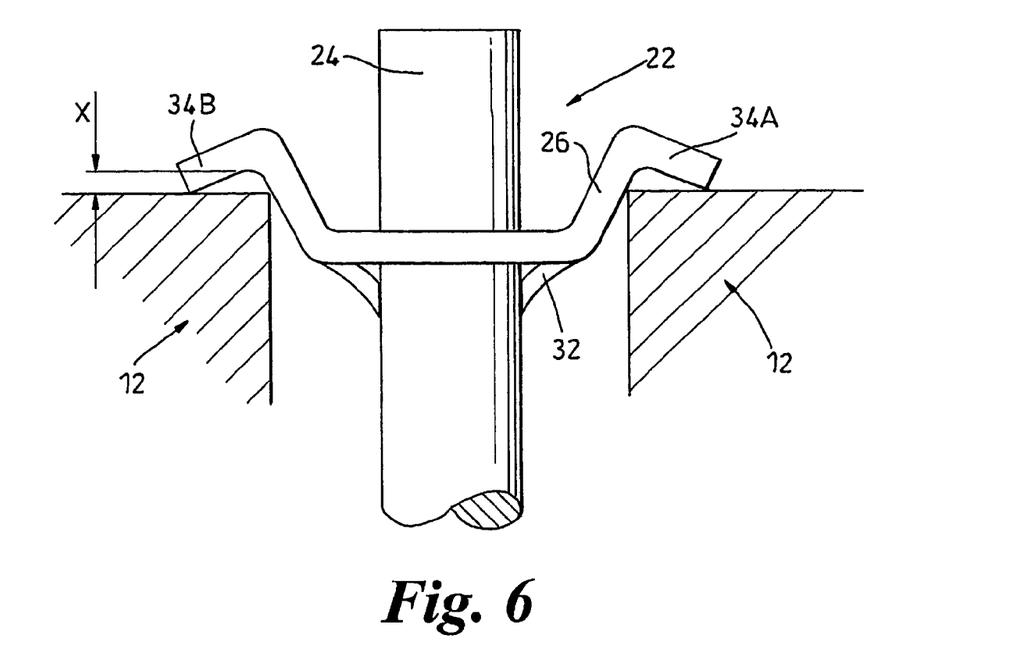
FIG. 6 illustrates another view of the retraction mechanism when the brakes are not applied.
Figure 7:
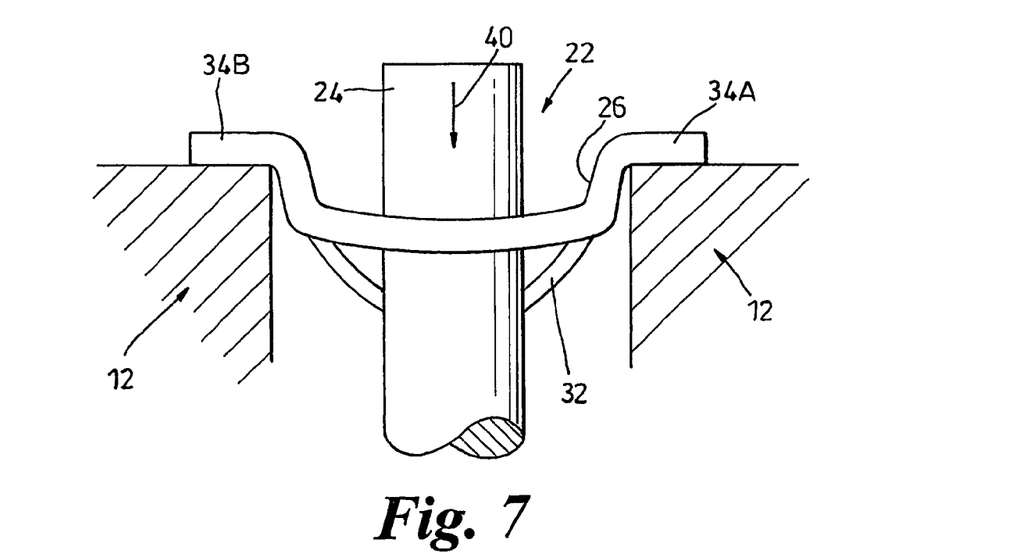
FIG. 7 illustrates another view of the retraction mechanism when the brakes are applied.

FIGS. 6 and 7 also illustrate the condition of the retraction mechanism 22 when the brake is not applied (FIG. 6) and when the brake is applied (FIG. 7). As shown therein, when the brake is applied, the clip 26 moves or deforms as shown in FIG. 7. In particular, when the brake is applied, the arms 34A and 34B of the clip 26 deform or flatten as shown in FIG. 7. Also, the prongs 32 can act like a clutch and allow the rod 24 to pass through in the direction of arrow 40 and adjust its position to take up pad wear. When the brakes are no longer applied the clip 26 will return to its original position shown in FIG. 6 moving the pad away from contact with the brake disc. Also, as shown in FIG. 7, a slight panting of the clip 26 in the region 26A can also tend to spring back the clip when the brake is released.

Figure 8:
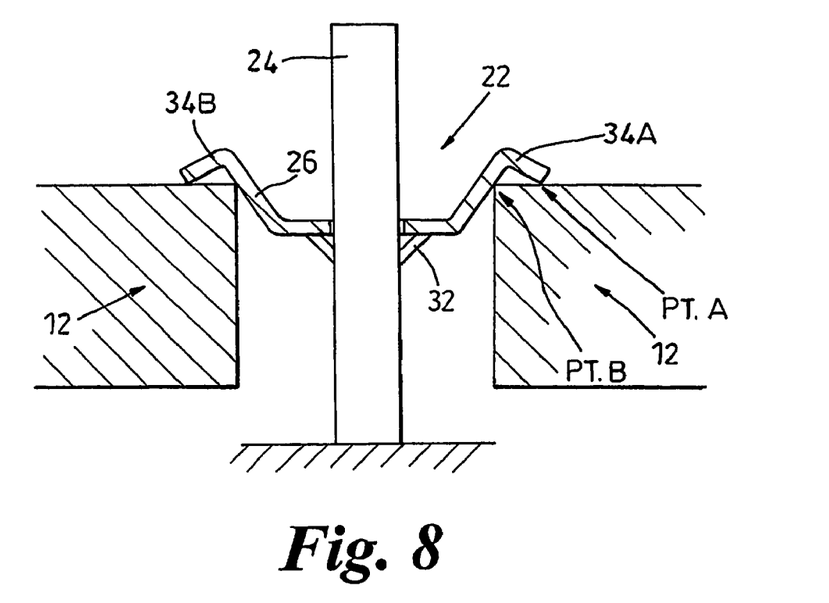
FIGS. 8 through 11 illustrates various views of the retraction mechanism when the brakes are either applied or not applied.
Figure 9:
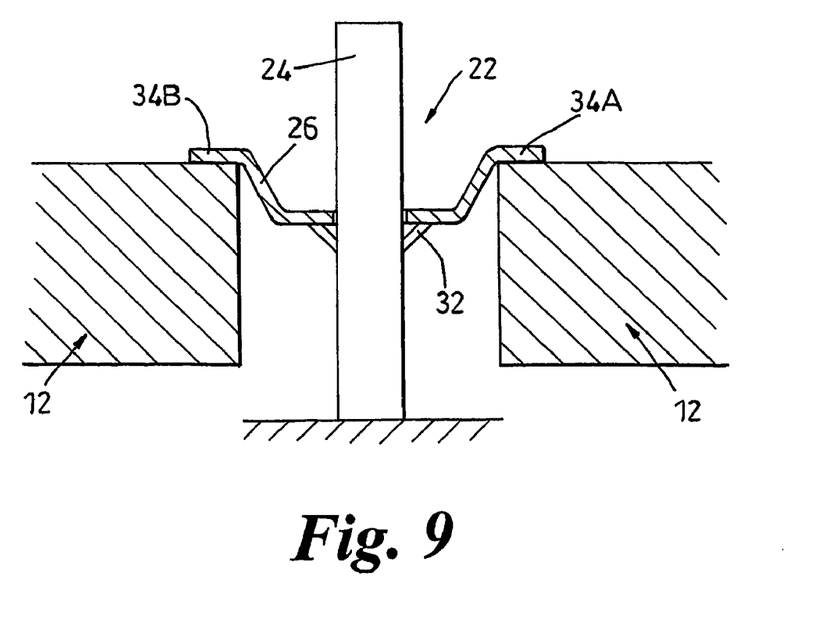
Figure 10:
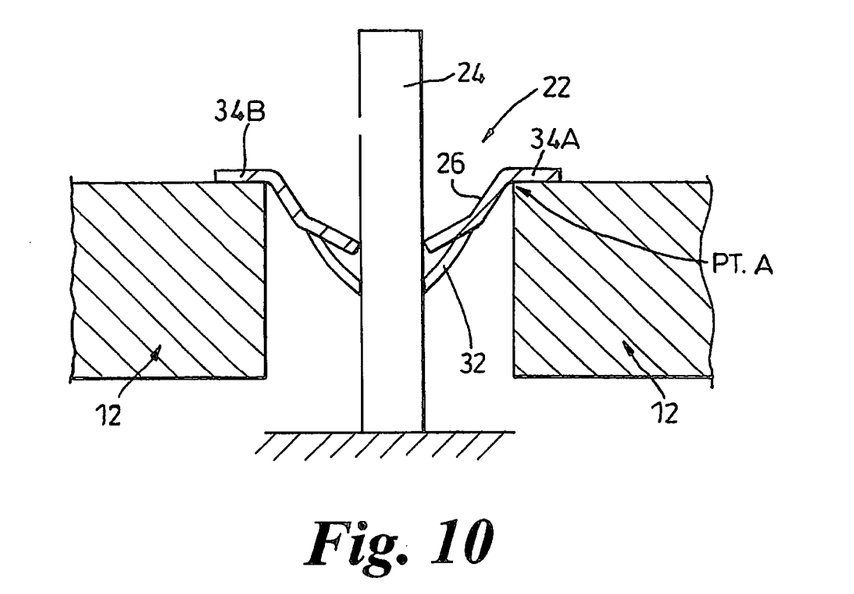
Figure 11:
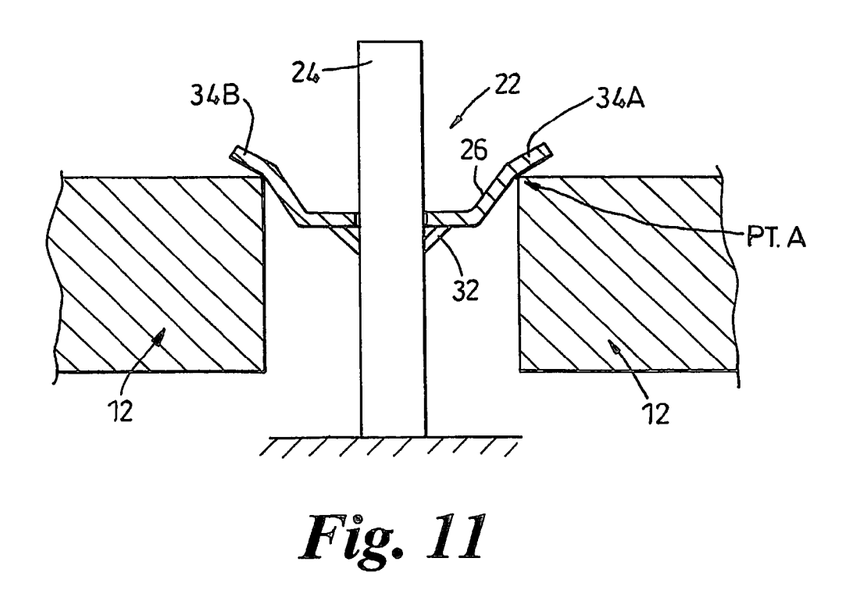

FIGS. 8 through 11 also illustrate the condition of the retraction mechanism 22 when the brake is not applied (FIG. 8) and possible positions when the brake is applied (FIGS. 9, 10 and 11). As shown therein, when the brake is not applied, the clip 26 is hard against the carrier 11 to prevent rattle as shown in FIG. 8 at Points A and B. As shown in FIG. 9, when the brake is applied, the clip 26 moves or deforms so that the clip arms 34A and 34B are flattened against the adjacent surface of the carrier abutment 12. As shown in FIG. 10, the prongs 32 of the clip 26 can pant and allow the rod 24 to pass through and adjust its position to take up pad wear. Also, as shown in FIG. 11, the clip arms 34A and 34B can flatten and then pivot at Point A on the carrier abutment 12.

Figure 12:
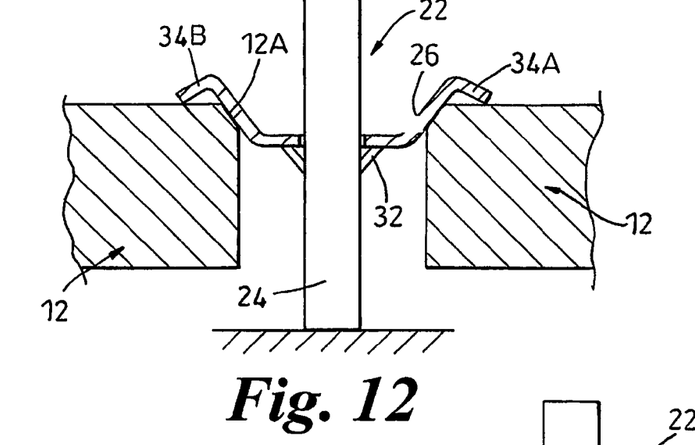
FIGS. 12 through 14 illustrates various views of the retraction mechanism when the brakes are either applied or not applied, showing an alternate construction of the carrier
Figure 13:
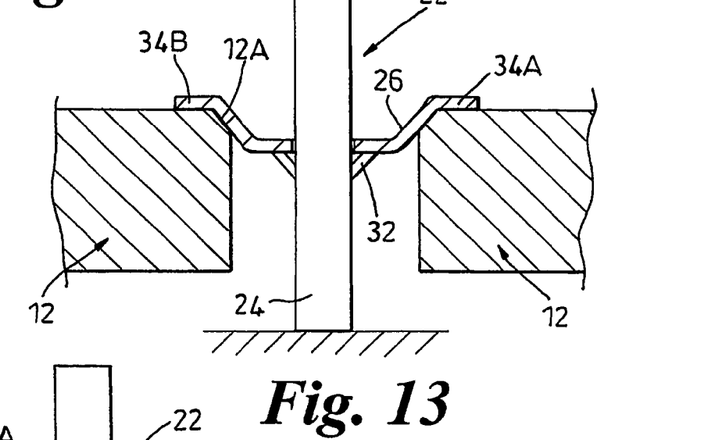
Figure 14:
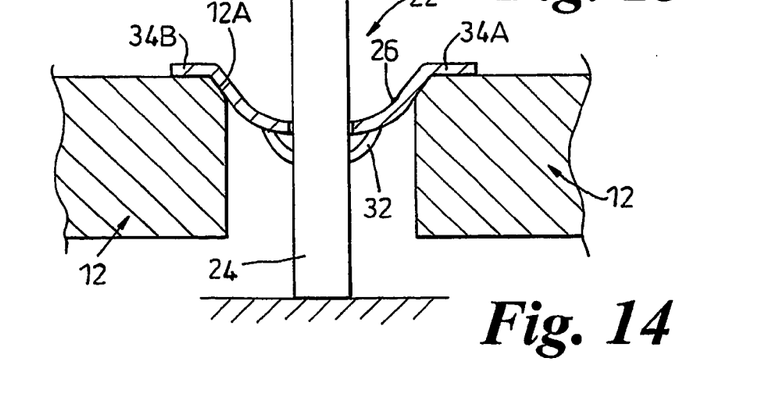

FIGS. 12 through 14 also illustrate the condition of the retraction mechanism 22 when the brake is not applied (FIG. 12) and possible positions when the brake is applied (FIGS. 13 and 14). Also, in this embodiment, the carrier abutment 12 has a chamfer surface 12A. As shown therein, when the brake is not applied, the clip 26 is hard against the chamfer surface 12A of the carrier 22 to prevent rattle as shown in FIG. 12. As shown in FIG. 13, when the brake is applied, the clip 26 moves or deforms so that the clip arms 34A and 34B are flattened against the adjacent surface of the carrier abutment 12. As shown in FIG. 14, the prongs 32 of the clip 26 can pant and allow the rod 24 to pass through and adjust its position to take up pad wear.

Figure 16:
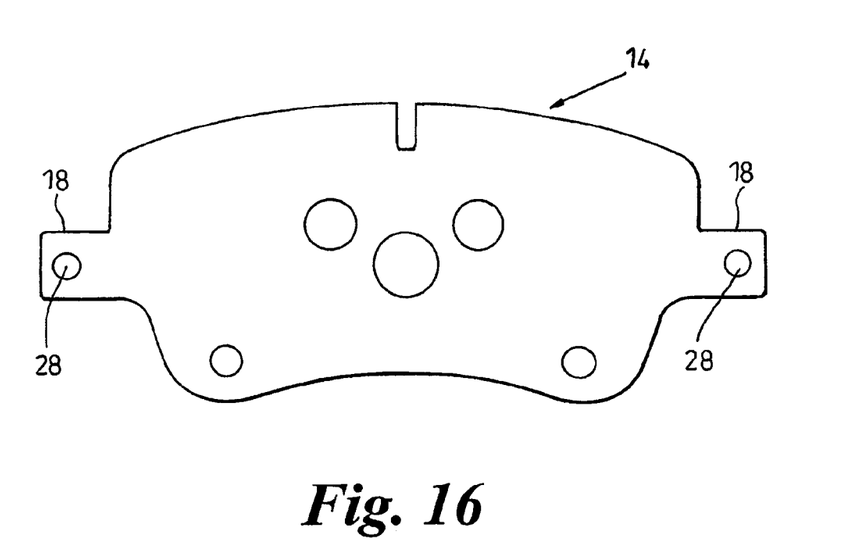
FIG. 16 is a view of a portion of a brake shoe assembly.
Figure 17:
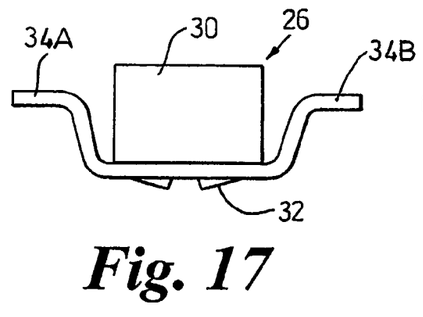
FIGS. 17–21 are various views of the clip of the retraction mechanism.
Figure 18:
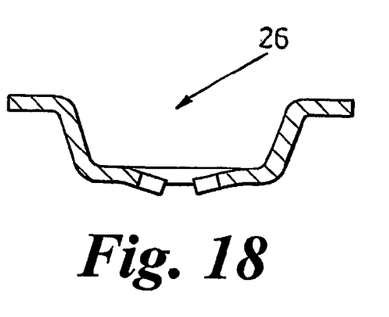
Figure 19:
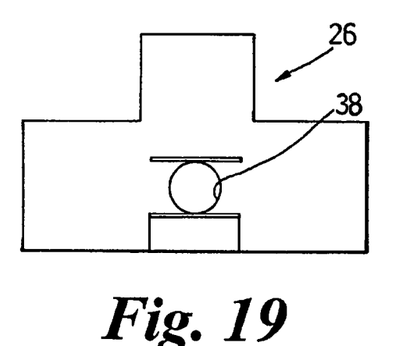
Figure 20:
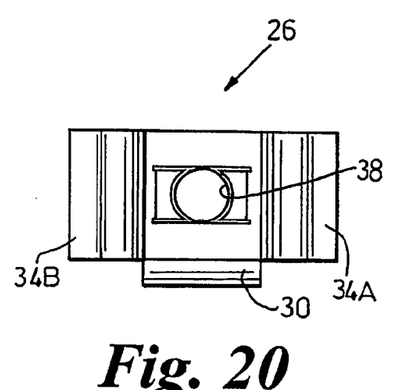
Figure 21:
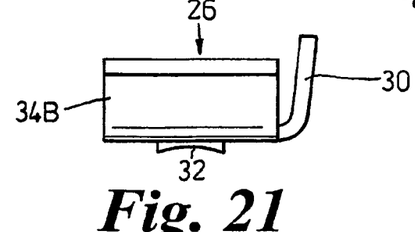
Figure 22:
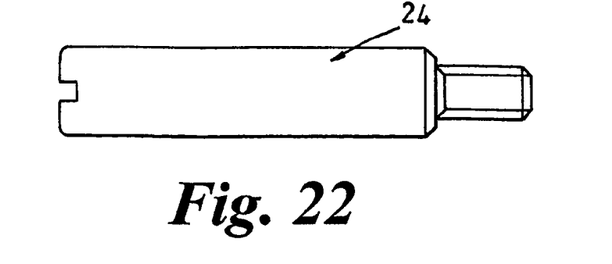
FIG. 22 is a view of the pin of the retraction mechanism.

FIG. 15 shows the carrier member 11, and FIG. 16 shows the brake shoe assembly 14. FIGS. 17 through 21 show various views of the clip 26 of the retraction mechanism, and FIG. 22 shows the pin 24 of the retraction mechanism.

In accordance with the provisions of the patent statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A disc brake assembly comprising an anchor bracket, a brake shoe which carries a friction pad and a piston slidably connected to the anchor bracket which is arranged such that upon movement of the piston relative to the anchor bracket the piston acts upon the brake shoe to move the shoe into contact with a brake disc, and in which the assembly further includes a retraction mechanism which is adapted to retract the brake shoe from the disc when the piston is retracted, the retraction mechanism comprising at least one pin secured to one of the friction pad and the anchor bracket and a spring clip fixed relative to the pin which acts between the pin and the other one of the anchor bracket and the friction pad, deformation of the spring clip as the pad is moved towards the disc providing a returning force to pull the friction pad away from the disc when the piston is retracted, and in which the spring clip is fixed in position relative to the pin during normal use but is adapted to slide along the pin in the event that the displacement of the friction pad relative to the anchor bracket due to wear of the friction pad produces a deformation of the spring clip which exceeds a predefined limit.

2. The disc brake assembly according to claim 1 in which the pin is secured to the brake shoe and the spring clip contacts the anchor bracket.

3. The disc brake assembly according to claim 2 in which the spring clip comprises a resilient plate having an opening through which the pin passes and defining at least one wing which is in contact with the anchor bracket, the wing deforming resiliently as the friction lining moves towards the disc.

4. The disc brake assembly of claim 3 in which the spring clip defines at least two wings which extend in opposing directions away from the opening and each wing is in contact with the anchor bracket.

5. The disc brake assembly according to claim 1 in which the spring clip is in direct engagement with the pin.

6. The disc brake assembly according to claim 1 in which the predefined limit is dependent upon the shape and location of the spring clip which is arranged such that a force required to move the clip along the pin is only provided when the spring clip is deformed in excess of a predefined amount.

7. The brake disc assembly according to claim 1 in which the engagement of the spring clip with the pin is such that the force required to move the clip along the pin away from the friction lining is greater than that required to move it along the pin towards the friction lining.

8. The brake disc assembly according to claim 1 in which the spring clip is permitted to move along the pin in only a single direction.

9. The brake disc assembly according to according to claim 1 in which the retraction device also provides a biasing force to the friction pad as it is displaced in a direction normal to the plane of the disc relative to the anchor bracket, the biasing force being provided by deformation of a portion of the spring clip.

10. The disc assembly according to claim 1 in which two retraction mechanisms are provided which are located at or adjacent each end of the brake shoe.

11. A brake shoe assembly for use in a disc brake assembly according to claim 1.

12. A brake shoe assembly which includes a friction lining adapted for use in a disc brake assembly having at least one pin secured to the brake shoe which carries a spring clip, the spring clip co-operating with the pin through a sliding frictional engagement and having at least one deformable wing which is adapted to contact an anchor bracket of the disc brake assembly, and whereby the engagement between the clip and the pin is such that the clip is fixed relative to the pin until a force applied to the clip exceeds a predetermined limit whereby the clip is adapted to slide along the pin away from the brake shoe.

13. The brake shoe assembly according to claim 12 in which the engagement of the clip with the pin is such that the clip is prevented from sliding along the pin towards the brake shoe.

14. The brake shoe assembly according to claim 12 in which the spring clip includes one or more tangs which are bent out of the plane of the spring clip towards the brake shoe assembly and project into an opening through which the pin passes to resiliently engage the pin.

15. The brake shoe assembly according to according to claim 12 in which the spring clip comprises a resiliently deformable star washer.

16. The brake shoe assembly according to according to claim 12 in which a pin is provided at each end of the brake shoe, each pin carrying a respective spring clip.

17. The brake shoe assembly according to according to claim 16 in which the pin is fixed at least partially within a bore provided in the brake shoe.

18. The brake shoe assembly according to according to claim 12 in which the pin is fixed at least partially within a bore provided in the brake shoe.

* * * * *

UNITED STATES PATENT AND TRADEMARK OFFICE
CERTIFICATE OF CORRECTION

PATENT NO. : 6,959,792 B2
DATED : November 1, 2005
INVENTOR(S) : Glynn Ashman et al.

It is certified that error appears in the above-identified patent and that said Letters Patent is hereby corrected as shown below:

Column 8,
Line 44, delete "16" and insert -- 12 --.
Line 47, delete "12" and insert -- 16 --.
Line 47, delete "the" and insert -- each --.

Signed and Sealed this

Seventeenth Day of January, 2006

JON W. DUDAS
*Director of the United States Patent and Trademark Office*